(12) United States Patent
Groarke

(10) Patent No.: US 10,482,437 B2
(45) Date of Patent: Nov. 19, 2019

(54) SYSTEMS AND METHODS FOR IDENTIFYING SUSPECT ILLICIT MERCHANTS

(71) Applicant: MasterCard International Incorporated, Purchase, NY (US)

(72) Inventor: Peter Groarke, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 559 days.

(21) Appl. No.: 14/971,616

(22) Filed: Dec. 16, 2015

(65) Prior Publication Data

US 2017/0178136 A1    Jun. 22, 2017

(51) Int. Cl.
| | |
|---|---|
| *G06Q 20/12* | (2012.01) |
| *G06Q 20/40* | (2012.01) |
| G06F 17/40 | (2006.01) |
| G06F 17/30 | (2006.01) |
| G06Q 10/00 | (2012.01) |
| G06F 21/00 | (2013.01) |
| H04L 29/06 | (2006.01) |

(52) U.S. Cl.
CPC ......... *G06Q 20/12* (2013.01); *G06Q 20/4016* (2013.01)

(58) Field of Classification Search
CPC .... G06Q 20/4014; G06Q 10/00; G06Q 20/12; G06F 17/40; G06F 17/30; G06F 21/00; H04L 29/06
See application file for complete search history.

(56) References Cited

U.S. PATENT DOCUMENTS

| | | | |
|---|---|---|---|
| 7,403,922 B1 | 7/2008 | Lewis et al. | |
| 7,693,810 B2 * | 4/2010 | Donoho | G06Q 40/00 705/35 |

(Continued)

OTHER PUBLICATIONS

Hong Kong/China: Alibaba head downplays dispute with chinese regulator. (Feb. 5, 2015). Asia News Monitor Retrieved from https://search.proquest.com/docview/1651227200?accountid=14753 (Year: 2015).*

(Continued)

*Primary Examiner* — Sarah M Monfeldt
*Assistant Examiner* — Muriel S Tinkler
(74) *Attorney, Agent, or Firm* — Armstrong Teasdale LLP

(57) ABSTRACT

An illicit website identifying (IWI) computing device is described herein, the IWI computing device configured to store a log of suspect illicit websites, the log including website content associated with each suspect illicit website. Each suspect illicit website is associated with a respective merchant. The IWI computing device is also configured to receive transaction data for at least one transaction initiated at a first suspect illicit website, the first suspect illicit website included within the log of suspect illicit websites, and analyze the received transaction data to identify one or more transactions including at least a portion of the website content associated with the first suspect illicit website. The IWI computing device is further configured to identify the first suspect illicit website and the merchant associated therewith as illicit for further investigation, and generate an identification report including the identified illicit website and merchant.

17 Claims, 8 Drawing Sheets

(56) References Cited

U.S. PATENT DOCUMENTS

| | | | | |
|---|---|---|---|---|
| 8,712,888 B2* | 4/2014 | Chisholm | | G06Q 30/06 |
| | | | | 705/35 |
| 8,924,549 B2* | 12/2014 | Raleigh | | G06Q 10/06375 |
| | | | | 709/224 |
| 9,495,547 B1* | 11/2016 | Schepis | | G06F 21/604 |
| 2004/0034604 A1* | 2/2004 | Klebanoff | | G06Q 20/04 |
| | | | | 705/65 |
| 2006/0235789 A1* | 10/2006 | Koch | | G06Q 20/10 |
| | | | | 705/39 |
| 2007/0005417 A1* | 1/2007 | Desikan | | G06Q 30/02 |
| | | | | 705/14.49 |
| 2007/0118607 A1* | 5/2007 | Nelissen | | G06Q 10/107 |
| | | | | 709/217 |
| 2009/0006860 A1* | 1/2009 | Ross | | H04L 63/126 |
| | | | | 713/189 |
| 2009/0172033 A1 | 7/2009 | Clark et al. | | |
| 2009/0249482 A1* | 10/2009 | Sarathy | | G06F 21/567 |
| | | | | 726/22 |
| 2009/0259574 A1* | 10/2009 | Thomsen | | G06Q 20/02 |
| | | | | 705/30 |
| 2013/0007443 A1* | 1/2013 | Grab | | G06F 21/10 |
| | | | | 713/156 |
| 2015/0278487 A1* | 10/2015 | Scott | | G06F 21/10 |
| | | | | 726/28 |
| 2015/0333985 A1* | 11/2015 | Offer | | H04L 43/028 |
| | | | | 709/224 |
| 2015/0348042 A1* | 12/2015 | Jivraj | | G06Q 20/322 |
| | | | | 705/44 |
| 2017/0011409 A1* | 1/2017 | Eager | | G06Q 30/0201 |
| 2017/0330196 A1* | 11/2017 | Larko | | G06Q 30/06 |

OTHER PUBLICATIONS

Antoniou, G., & Batten, L. (2011). E-commerce: Protecting purchaser privacy to enforce trust. Electronic Commerce Research, 11(4), 421-456. doi:http://dx.doi.org/10.1007/s10660-011-9083-3 (Year: 2011).*

Braun, M., McAndrews, J., Roberds, W., & Sullivan, R. (2008). Understanding Risk Management in Emerging Retail Payments. Economic Policy Review—Federal Reserve Bank of New York, 14(2), 137-159. Retrieved from https://search.proquest.conn/docview/210395958?accountid=14753 (Year: 2008).*

* cited by examiner

SYSTEMS AND METHODS FOR IDENTIFYING SUSPECT ILLICIT MERCHANTS

BACKGROUND

This disclosure relates to illicit e-commerce and, more specifically, to network-based systems and methods for identifying suspect illicit merchants by using financial transaction data.

Over the past several years, e-commerce has increased to the point where over one million dollars of e-commerce transactions occur about every 30 seconds. Understandably, many merchants now provide virtual purchase platforms (in addition to in-person, brick-and-mortar purchase platforms), offering merchant-run websites that allow consumers to browse their stores and purchase goods simply and conveniently. However, as legitimate e-commerce has increased in volume, illegitimate e-commerce has also increased. Illegitimate e-commerce refers generally to illegal transactions performed over the Internet, including selling counterfeit goods, selling illegal products (e.g., prohibited substances), or trafficking in child pornography. Such illegitimate e-commerce may cause brand and/or reputation damage for a number of parties, for example, the brands whose goods are being counterfeited, as well as the payment processing network that processes and therefore facilitates such illicit transactions. There is a need for a system that identifies websites, merchants, and/or acquirers suspected of such illicit activity.

BRIEF DESCRIPTION OF THE DISCLOSURE

In one aspect, an illicit website identifying (IWI) computing device including a processor in communication with a memory is provided. The processor is programmed to store, at the memory, a log of suspect illicit websites. The log includes website content associated with each suspect illicit website, and each suspect illicit website is associated with a respective merchant. The processor is also configured to receive transaction data for at least one transaction initiated at a first suspect illicit website, the first suspect illicit website included within the log of suspect illicit websites. The processor is further configured to analyze the received transaction data to identify one or more transactions including at least a portion of the website content associated with the first suspect illicit website, identify the first suspect illicit website and the merchant associated therewith as illicit for further investigation, and generate an identification report including the identified illicit website and merchant.

In another aspect, a computer-implemented method for identifying illicit websites and merchants using an illicit website identifying (IWI) computing device including a processor in communication with a memory is provided. The method includes storing, at the memory, a log of suspect illicit websites. The log includes website content associated with each suspect illicit website, and each suspect illicit website is associated with a respective merchant. The method also includes receiving transaction data for at least one transaction initiated at a first suspect illicit website, the first suspect illicit website included within the log of suspect illicit websites, and analyzing the received transaction data to identify one or more transactions including at least a portion of the website content associated with the first suspect illicit website. The method further includes identifying the first suspect illicit website and the merchant associated therewith as illicit for further investigation, and generating an identification report including the identified illicit website and merchant.

In yet another aspect, at least one non-transitory computer-readable storage media having computer-executable instructions embodied thereon is provided. When executed by at least one processor in communication with a memory, the computer-executable instructions cause the processor to store, at the memory, a log of suspect illicit websites, the log including website content associated with each suspect illicit website. Each suspect illicit website is associated with a respective merchant. The computer-executable instructions also cause the processor to receive transaction data for at least one transaction initiated at a first suspect illicit website, the first suspect illicit website included within the log of suspect illicit websites, and analyze the received transaction data to identify one or more transactions including at least a portion of the website content associated with the first suspect illicit website. The computer-executable instructions further cause the processor to identify the first suspect illicit website and the merchant associated therewith as illicit for further investigation, and generate an identification report including the identified illicit website and merchant.

BRIEF DESCRIPTION OF THE DRAWINGS

FIG. 1 is a schematic diagram illustrating an example multi-party payment card system that includes an illicit website identification computing device.

FIG. 2 is a simplified block diagram of an example illicit activity monitoring (IAM) computer system used to leverage transaction data received from the payment card system shown in FIG. 1 to identify merchants suspected to be engaged in illicit e-commerce and websites associated therewith.

FIG. 3 is an expanded block diagram of an example embodiment of a computer server system architecture of a processing system used to leverage transaction data to identify suspects merchants and/or suspect websites in accordance with one embodiment of the present disclosure.

FIG. 4 illustrates an example configuration of a server system that may be used with the IAM computer system shown in FIG. 2.

FIG. 5 illustrates an example configuration of a user system operated by a user that may be used with the IAM computer system shown in FIG. 2.

FIG. 6 is a simplified data flow diagram for identifying illicit websites and merchants associated therewith using the IAM computer system shown in FIG. 2.

FIG. 7 is a flowchart of a method for identifying illicit websites and merchants associated therewith using the IAM computer system shown in FIG. 2.

FIG. 8 is a diagram of components of an illicit website identifying (IWI) computing device that may be used in using the IAM computer system shown in FIG. 2.

Figure 1:
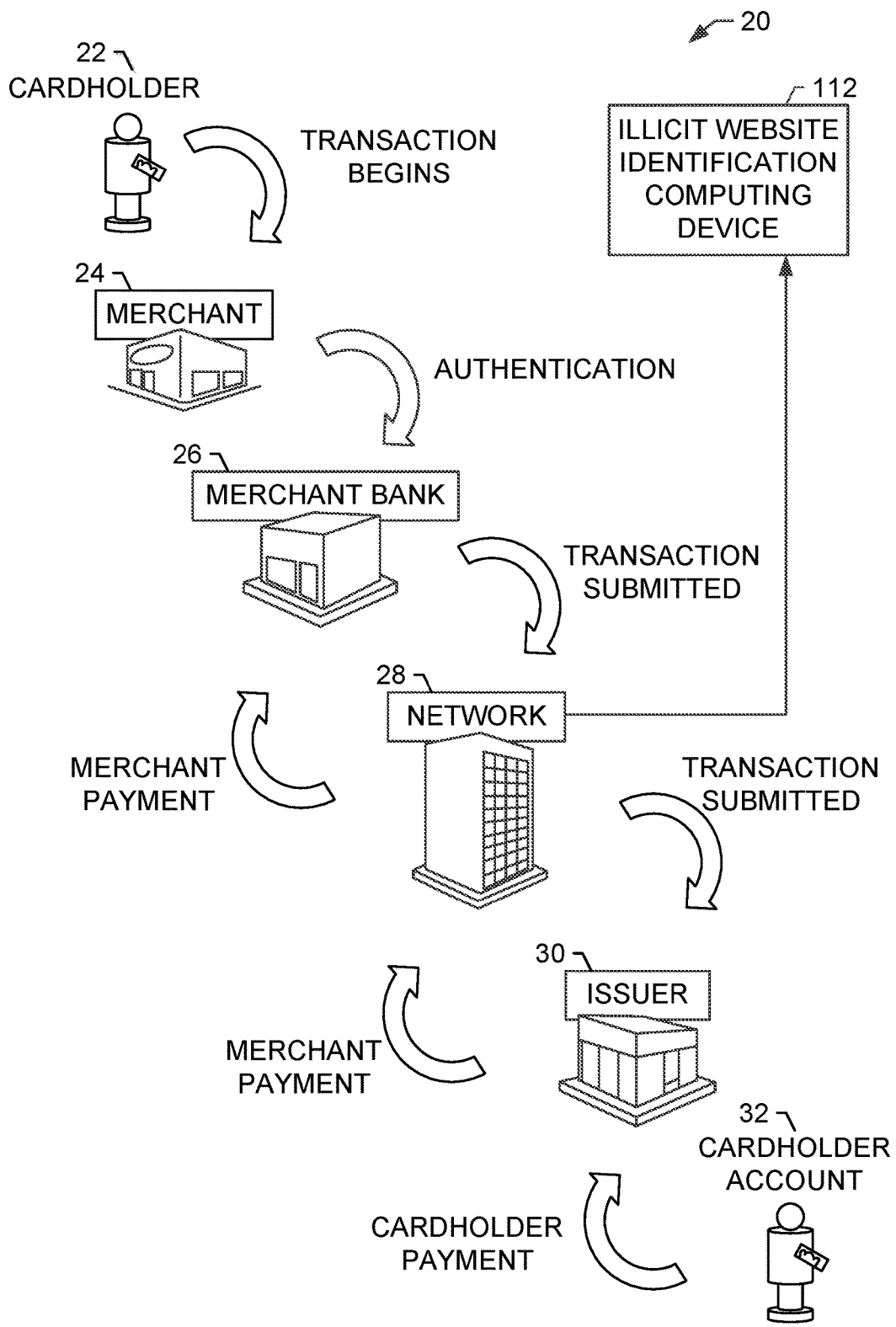
FIGS. 1-8 show example embodiments of the methods and systems described herein.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

Private groups and public agencies, including governmental agencies and investigating departments within certain privately owned companies, have been established to locate, investigate, and shut down illicit merchants. These agencies use systems configured to detect illicit merchants that may include web-crawling for particular keywords (e.g., brand names of popular counterfeit items such as high-end handbags or medicines, brand name misspellings, combinations of brand names with words such as "cheap," etc.) and report feedback (e.g., reports from consumers, legitimate manufacturers, law-enforcement agencies, etc.) of illicit merchants or goods. In these known systems, a list of suspect websites is assembled that requires further investigation. At least one of the problems with these known systems is that it is incredibly difficult and time consuming to investigate each particular suspect website, in part due to the sheer volume of suspect websites. Accordingly, there is a need for a system that facilitates a narrowing of the pool of suspect websites by leveraging additional data to flag or identify websites that are more likely to be associated with illicit activity.

The illicit activity monitoring (IAM) system described herein is configured to leverage transaction data with reported feedback as well as web-crawled data to identify suspect merchants or acquirers (e.g., merchant banks or financial institutions) for further investigation. The IAM system includes a payment processing network configured to process payment transactions initiated by cardholders having a payment card associated with the payment processing network. The payment processing network may include one or more transaction processors and/or one or more transaction databases for storing data associated with the processed transactions ("transaction data"). Transaction data may include, for example, a transaction amount, a merchant name (or other identifier), a merchant address, a merchant category code (an indication of the industry or type of business in which the merchant is involved), a country code for the merchant, a country code of the cardholder, and/or a product identifier (e.g., Stock Keeping Unit (SKU) or Line Item data; product identifier may be included in authorization of transaction and/or during clearing of transaction). The payment processing network provides transaction processing services to a plurality of acquiring banks, which generally service merchants, and a plurality of issuing banks, which generally service cardholders. Accordingly, the transaction database(s) included in the payment processing network may maintain a list or log of acquiring banks that are customers of the payment processing network, including identifiers, addresses, and/or other information associated therewith. Each acquiring bank has one or more individual merchant customers that use the services of the payment processing network through the acquiring bank. Accordingly, each acquiring bank may maintain a list or log of merchants that are customers of the acquiring bank, including identifiers, addresses, and/or other information associated therewith. Additionally or alternatively, the payment processing network may maintain the list or log of merchants associated with each acquiring bank.

The IAM system further includes at least one web-crawler. A "web-crawler" refers generally to software configured to browse the Internet and index or copy visited websites (wherein a website may include one or more webpages) for further analysis. Web-crawlers may be additionally or alternatively configured to extract information from visited websites, for example, according to keywords or other programmed instructions. In the example embodiment, the web-crawler may be configured to index, copy, and/or extract information from websites including specific keywords related to illicit online activity. The web-crawler may be integral to and/or associated with the payment processing network, or may be associated with a third party.

The IAM system further includes at least one reporting database (which may be integral to or separate from the transaction database(s) described above) for storing information, including web-crawled data, reported feedback from third parties, as well as logs of active acquirers and/or merchants associated with the payment processing network (described above). The web-crawled data and/or reported feedback include a number of suspect illicit websites. The suspect illicit websites may have been identified by the web-crawler as including one or more suspect keywords, or by feedback from one or more third parties that the website includes suspect website content (e.g., sells or appears to sell counterfeit or other illegal merchandise). In the example embodiment, the reporting database further includes a set of instructions for a web-crawler to implement on suspect illicit websites (also referred to herein as "suspect websites"). The instructions direct the web-crawler to mine the suspect websites for additional website content associated with the suspect illicit products (also referred to herein as "suspect products") being offered for sale on the suspect websites. For example, the website content may include one or more of: (i) merchant details such as a name, address, and/or country of the merchant associated with the suspect website; (ii) a product price associated with the suspect product(s); and/or (iii) additional product details associated with the suspect product(s), such as a product description (e.g., handbag) and/or SKU data or other product code.

In the example embodiment, the IAM system further includes an illicit website identifying (IWI) computing device in communication with at least the payment processing network (e.g., a transaction processor and/or transaction database integral thereto) and the reporting database. The IWI computing device is configured to receive transaction data from the payment processing network and analyze the received transaction data for transactions that match the suspect websites. More specifically, the IWI computing device analyzes the transaction data to identify transactions that include at least a portion of the website content associated with the suspect websites, for example, the merchant name or address and/or the suspect product. The IWI computing device then "flags" or identifies the suspect website and/or a merchant or acquirer associated therewith as an illicit website and/or an illicit merchant or acquirer for further investigation. Such identification of the suspect website as illicit may include sending a message to an investigating party (e.g., the payment processing network, a law enforcement agency, etc.). The identification may additionally or alternatively include a message (e.g., a warning or cease-and-desist) to the merchant associated with the illicit website and/or to the acquirer associated with that merchant. A log or report of flagged or identified websites, merchants, and/or acquirers may be stored at the reporting database.

In some embodiments, the IWI computing device is configured to implement one or more rules or parameters to determine whether to identify a suspect website and/or a merchant or acquirer associated therewith. For example, one rule may require that two or more fields match, between transaction data associated with a transaction made on the suspect website and the website content of the suspect website, such as both a merchant name and a product price. As another example, certain parameters may employ semi-empirical data that encourages identification of a suspect website and/or a merchant or acquirer associated therewith, such as a merchant country code of "high-risk" countries including China or India (which may be known to be a common source of certain illicit products). As yet another example, the IWI computing device may implement a rule that causes flagging or identification of a suspect website as illicit upon deviation of a transaction amount and/or product price from a known "normal" price. For example, the IWI computing device may maintain a list or log of commonly counterfeit items along with their suggested retail price (from a legitimate retailer) on the reporting database. When a transaction is initiated on a suspect illicit website for a product matching the description of the commonly counterfeit item, with a much lower price (e.g., a certain percentage lower), the IWI computing device may flag the suspect webpage and/or a merchant or acquirer associated therewith as illicit.

The methods and systems described herein may be implemented using computer programming or engineering techniques including computer software, firmware, hardware, or any combination or subset therefor. At least one of the technical problems addressed by this system includes: (i) difficult and time-consuming tracking and identification of suspect merchants conducting fraudulent or illicit transactions over webpages; (ii) disparate reporting sources of illicit merchants, those sources lacking communication therebetween and/or having difficulty cross-referencing or aggregating reports; and (iii) delay in responding to reports requiring investigation.

The technical effect of the systems and methods described herein is achieved by performing at least one of the following steps: (a) storing, at a memory, a log of suspect illicit websites, the log including website content associated with each suspect illicit website, wherein each suspect illicit website is associated with a respective merchant; (b) receiving transaction data for at least one transaction initiated at a first suspect illicit website, the first suspect illicit website included within the log of suspect illicit websites; (c) analyzing the received transaction data to identify one or more transactions including at least a portion of the website content associated with the first suspect illicit website; (d) identifying the first suspect illicit website and the merchant associated therewith as illicit for further investigation; and (e) generating an identification report including the identified illicit website and merchant.

By performing these steps, the systems and methods solve the above problems specific to e-commerce of tracking, identification, and monitoring suspect illicit merchants. More specifically, the systems and methods provide: (i) enhanced leveraging of existing data to identify merchants engaging in illicit e-commerce; (ii) improved response time following identification of suspect merchants; and (iii) optimized tracking, identification, and monitoring of online merchants and associated websites using e-commerce-specific tools.

Described herein are computer systems such as an illicit website identification (IWI) computing device, a payment network computing device, merchant computing devices, client computing devices, and related systems. As described herein, all such computer systems include a processor and a memory. However, the IWI computing device is specifically configured to carry out the steps described herein.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to identification of suspect illicit websites and/or merchants suspected to engage in illicit e-commerce.

FIG. 1 is a schematic diagram illustrating an example multi-party payment card system 20 that includes an illicit website identification computing device 112. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

As described herein, illicit website identification (IWI) computing device 112 is in communication with payment network 28 and accordingly may receive transaction data associated with each transaction processed on payment network 28. IWI computing device 112 is configured to receive, send, and process transactions initiated by cardholders 22 at websites maintained by or otherwise associated with suspect merchants 24.

Figure 2:
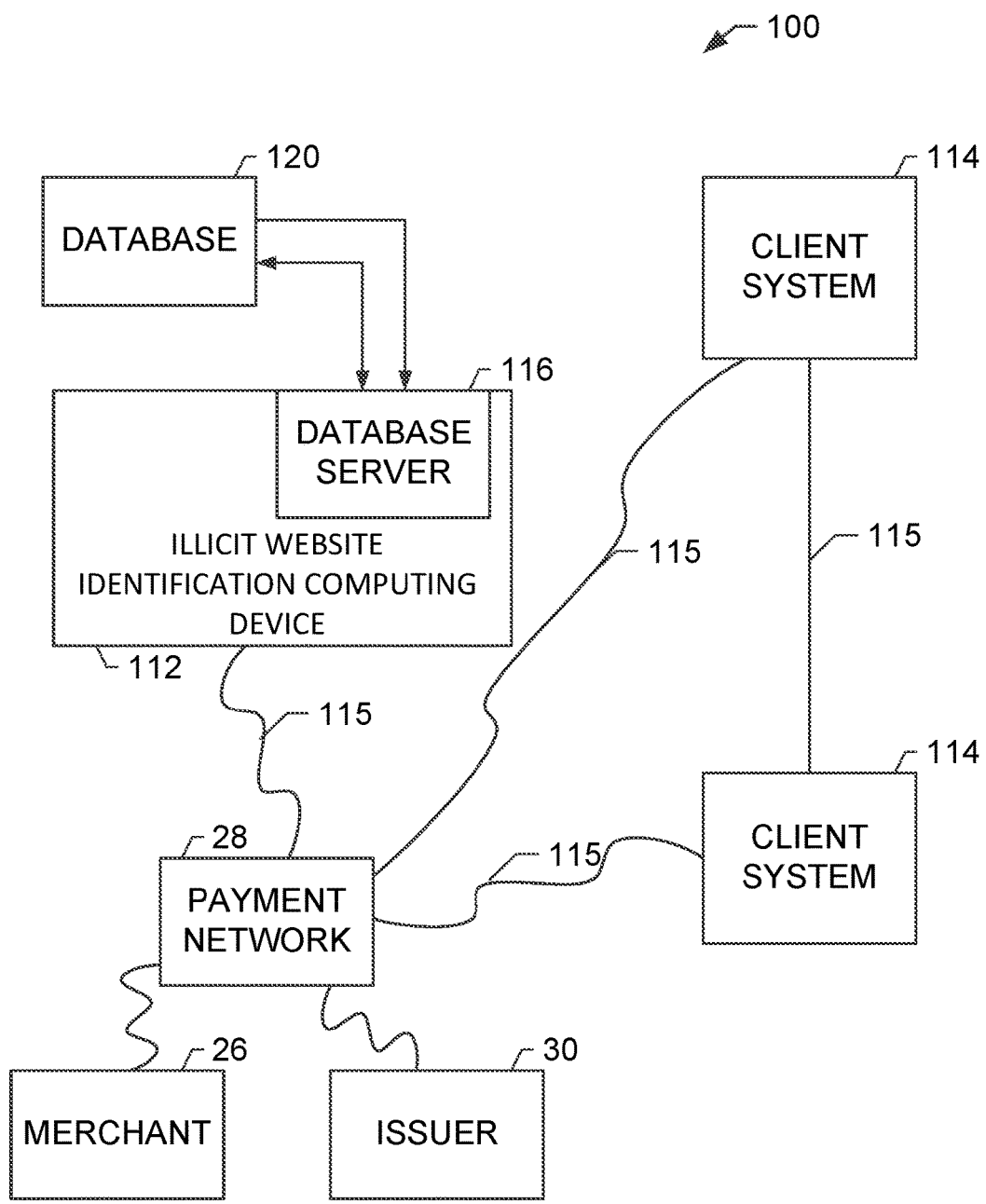

FIG. 2 is a simplified block diagram of an example illicit activity monitoring (IAM) computer system 100 used to leverage transaction data to identify merchants suspected to be engaged in illicit e-commerce ("suspect merchants" or "suspect illicit merchants") and websites associated therewith ("suspect websites" or "suspect illicit websites"). In the example embodiment, IAM system 100 is used for storing a log of suspect illicit websites, the log including website content associated with each suspect illicit website, wherein each suspect illicit website is associated with a respective merchant, receiving transaction data for at least one transaction initiated at a first suspect illicit website, the first suspect illicit website included within the log of suspect illicit websites, analyzing the received transaction data to identify one or more transactions including at least a portion of the website content associated with the first suspect illicit website, identifying the first suspect illicit website and the merchant associated therewith as illicit for further investigation, and/or generating an identification report including the identified illicit website and merchant, as described herein.

More specifically, in the example embodiment, IAM system 100 includes an illicit website identification (IWI) computing device 112, and a plurality of client sub-systems, also referred to as client systems 114, connected to IWI computing device 112. In one embodiment, client systems 114 are computers including a web browser, such that IWI computing device 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 or merchants 24 (both shown in FIG. 1). IWI computing device 112 is also in communication with payment network 28 (also shown in FIG. 1) using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on IWI computing device 112 and can be accessed by potential users at one of client systems 114 by logging onto IWI computing device 112 through one of client systems 114. In an alternative embodiment, database 120 is stored remotely from IWI computing device 112 and may be non-centralized. Databases 116 and 120 may be configured to store transaction data; merchant logs; acquirer logs; web-crawler instructions, keywords, indices, and/or results; third-party reports of suspect merchants and/or websites associated therewith; website content; product details including prices; flagged or identified suspect merchants and/or websites; and/or flagging or identification rules or parameters.

Database 120 may include a single database having separated sections or partitions, or may include multiple databases, each being separate from each other. Database 120 may store transaction data generated over the processing network including data relating to merchants, account holders, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, instructions for settling transactions including merchant bank account information, merchant country codes, and merchant category codes. Database 120 may also store purchase data associated with items being purchased by a cardholder from a merchant, and authorization request data.

In one embodiment, one of client systems 114 may be associated with acquirer bank 26 (shown in FIG. 1) while another one of client systems 114 may be associated with issuer bank 30 (shown in FIG. 1). In another embodiment, one of client systems 114 may be associated with cardholder 22 while another one of client systems 114 may be associated with merchant 24. IWI computing device 112 may be associated with interchange network 28. In the example embodiment, IWI computing device 112 is associated with a network interchange, such as interchange network 28, and may be referred to as an interchange computer system or to alternatively receive data from the interchange computer system. IWI computing device 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers, and/or billers.

Figure 3:
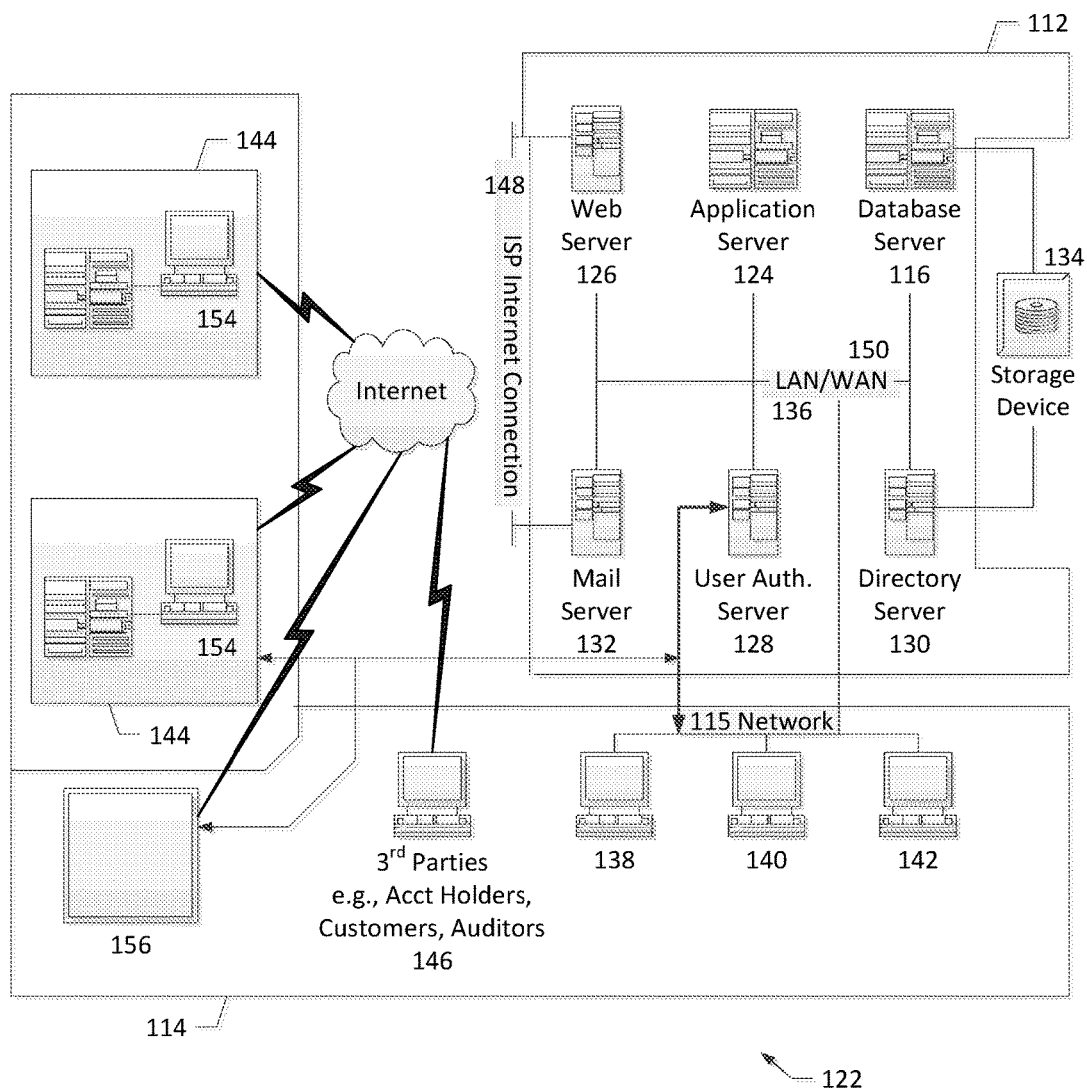

FIG. 3 is an expanded block diagram of an example embodiment of a computer server system architecture of a processing system 122 used to leverage transaction data to identify suspects merchants and/or suspect websites in accordance with one embodiment of the present disclosure. Components in system 122, identical to components of system 100 (shown in FIG. 2), are identified in FIG. 3 using the same reference numerals as used in FIG. 2. System 122 includes illicit website identification (IWI) computing device 112 (alternately referred to herein as a "server system" or "server computing device" 112), client systems 114, and payment systems 118. IWI computing device 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

IWI computing device 112 is configured to be operated by various individuals including employees 144 and to third parties, e.g., account holders, customers, auditors, developers, consumers, merchants, acquirers, issuers, private and public fraud or illicit activity identification or monitoring entities, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. IWI computing device 112 is also configured to be communicatively coupled to payment systems 118. Payment systems 118 include computer systems associated with merchant bank 26, interchange network 28, issuer bank 30 (all shown in FIG. 1), and interchange network 28. Additionally, payments systems 118 may include computer systems associated with acquirer banks and processing banks. Accordingly, payment systems 118 are configured to communicate with IWI computing device 112 and provide transaction data as discussed below.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with IWI computing device 112.

Also, in the example embodiment, web server 126, transaction server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, transaction server 124, database server 116, and/or directory server 130. User authentication server 128 may communicate with remotely located client systems, including a client system 156. User authentication server 128 may be configured to communicate with other client systems 138, 140, and 142 as well.

Figure 4:
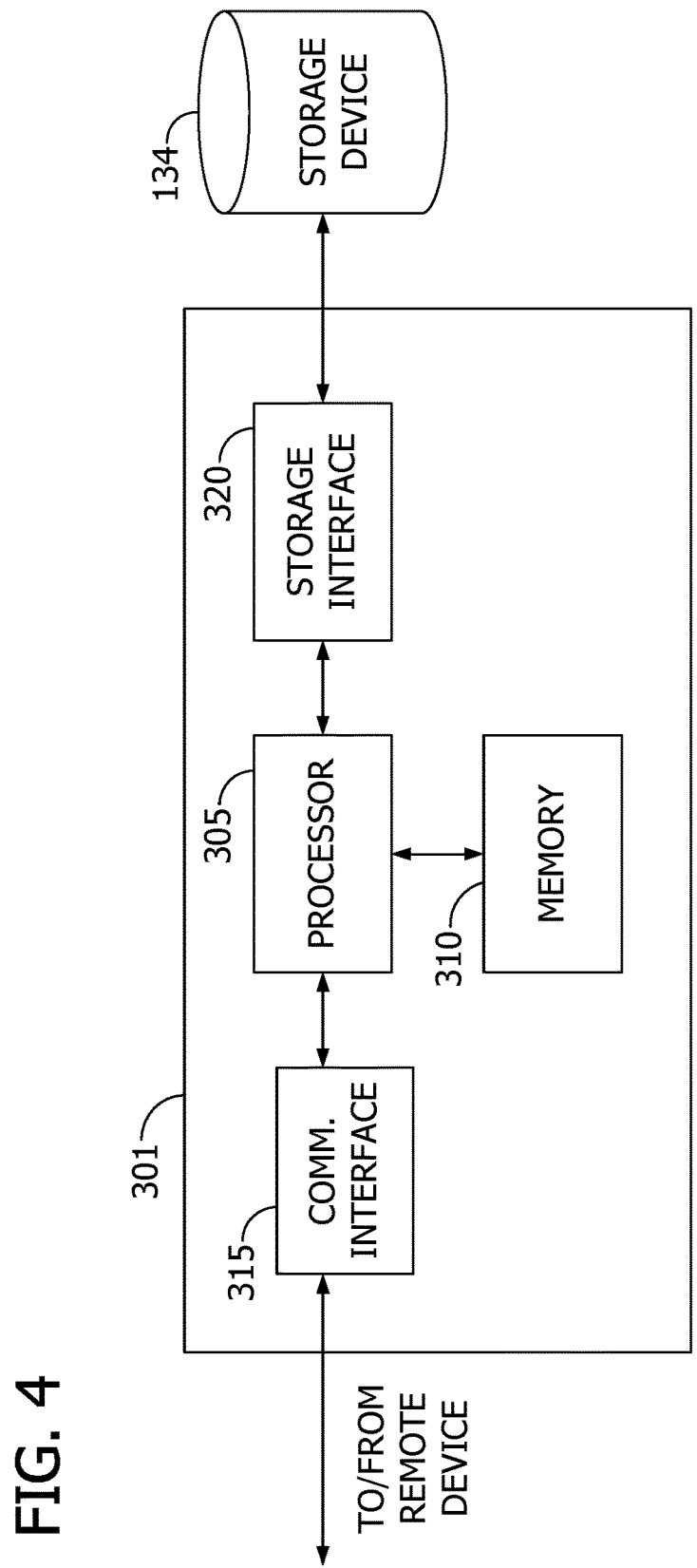

FIG. 4 illustrates an example configuration of a server system 301 such as illicit website identification computing device 112 (shown in FIGS. 2 and 3). Server system 301 may include, but is not limited to, database server 116, transaction server 124, web server 126, user authentication server 128, directory server 130, and mail server 132. In the example embodiment, server system 301 analyzes transaction data to identify suspect illicit websites and/or merchants, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
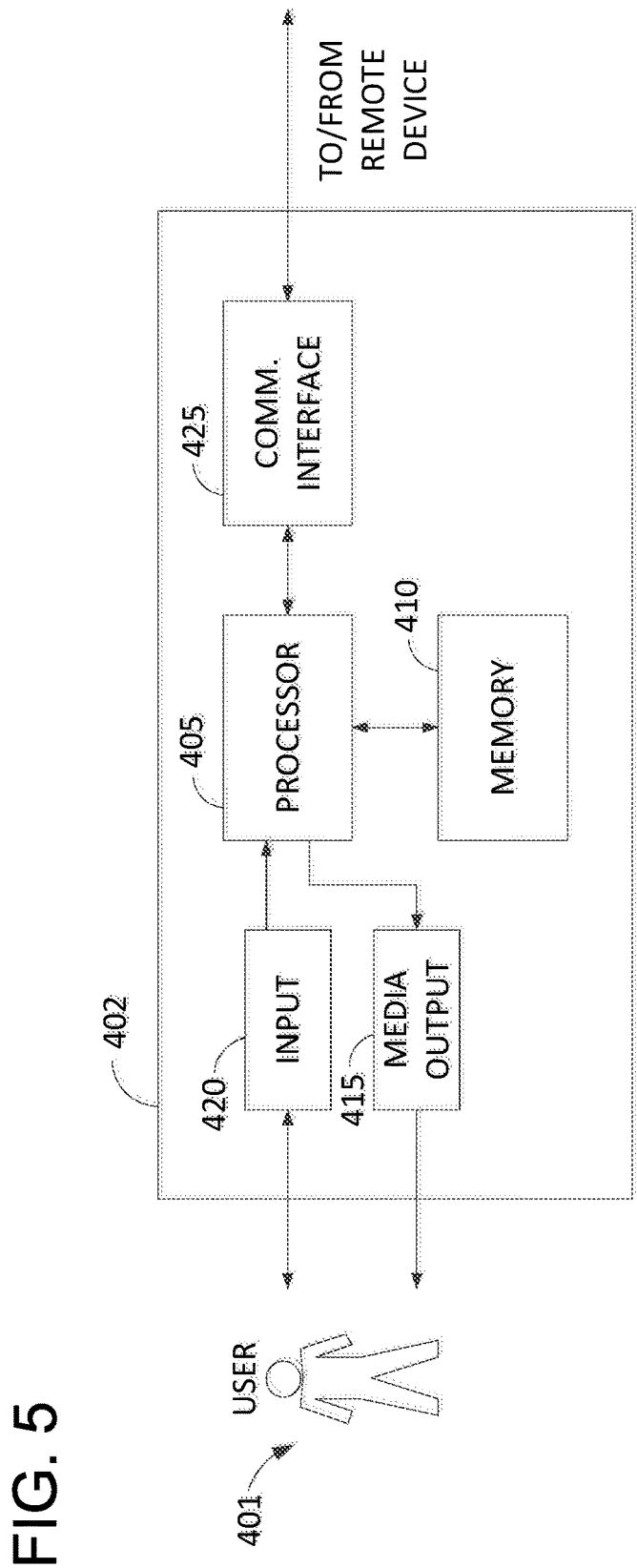

FIG. 5 illustrates an example configuration of a user system 402 operated by a user 401, such as cardholder 22 (shown in FIG. 1). In some embodiments, user system 402 is a client system 114 (shown in FIG. 2). In the example embodiment, user system 402 includes a processor 405 for executing instructions. In some embodiments, executable instructions are stored in a memory area 410. Processor 405 may include one or more processing units, for example, a multi-core configuration. Memory area 410 is any device allowing information such as executable instructions and/or written works to be stored and retrieved. Memory area 410 may include one or more computer-readable media.

User system 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device, a liquid crystal display (LCD), organic light emitting diode (OLED) display, or "electronic ink" display, or an audio output device, a speaker or headphones.

In some embodiments, user system 402 includes an input device 420 for receiving input from user 401. Input device 420 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 415 and input device 420. User system 402 may also include a communication interface 425, which is communicatively couplable to a remote device such as IWI computing device 112 (shown in FIG. 2). Communication interface 425 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 410 are, for example, computer readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from, for example, a merchant 24 (shown in FIG. 1). A client application allows user 401 to interact with a server application from, for example, a third-party server.

In one embodiment, computing device 402 is a client system (e.g., client system 114, shown in FIG. 2) from which user 401 engages with an online merchant (e.g., merchant 24, shown in FIG. 1) to perform a transaction that undergoes analysis by IWI computing device 112 to identify whether the merchant is suspected to be engaged in illicit e-commerce (e.g., selling counterfeit items, controlled substances, or contraband).

Figure 6:
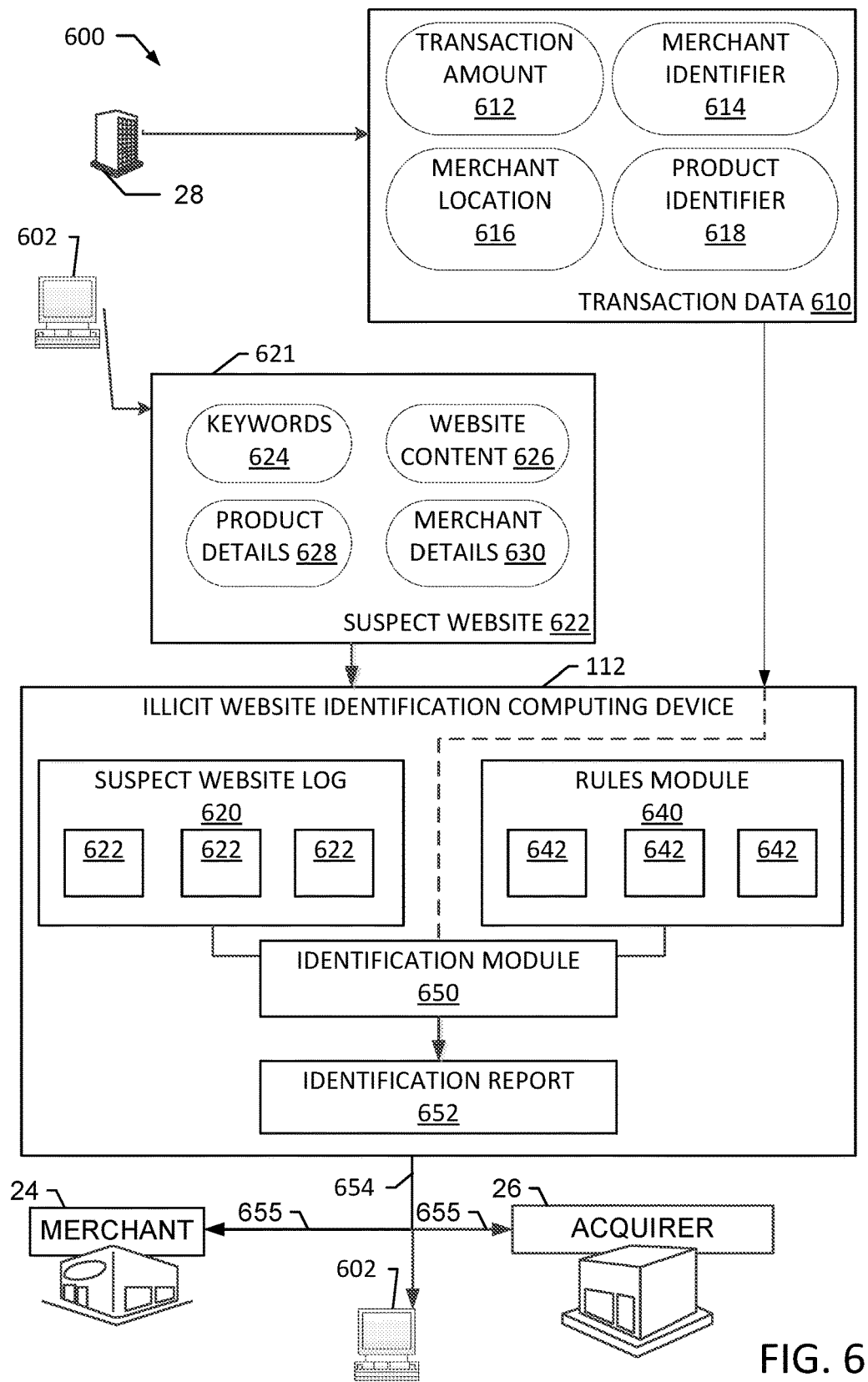

FIG. 6 is a simplified data flow diagram 600 for identifying illicit websites and merchants associated therewith using illicit website identifying (IWI) computing device 112. As described herein, IWI computing device 112 receives transaction data 610 from interchange network 28 (shown in FIG. 1), for example, from a payment processor (not shown) integral thereto. Transaction data 610 is associated with one or more transactions initiated by a cardholder (e.g., cardholder 22, shown in FIG. 1) using a payment card (or any other payment device) at a merchant website (not shown in FIG. 6). Transaction data 610 includes a number of elements, for example, a transaction amount 612 of the one or more transactions initiated at the merchant website, and a merchant identifier 614 of a merchant associated with the merchant website. For example, the merchant may maintain the merchant website, may sell one or more products offered for sale at the merchant website, and/or may be otherwise associated with the merchant website and/or the content thereon. Transaction data 610 further includes a merchant location 616 of the associated merchant, such as a zip code or country code, and at least one product identifier 618 of the product(s) purchased in the at least one transaction.

IWI computing device 112 also receives a signal 621 from a client system 602, which may be similar to one or more of client systems 114 (shown in FIG. 2). In the example embodiment, client system 602 includes a web-crawler configured to "crawl" Internet content according to defined rules and parameters, which may include particular keywords, date ranges, websites or content of interest, and/or any other rules. The web-crawler may index, store, identify, and/or otherwise analyze or process crawled content. Signal 621 received from client system 602 includes suspect website data 622 associated with at least one suspect website. In the example embodiment, suspect website data 622 includes at least one keyword 624. In some embodiments, keywords 624 represent a subset of a plurality of keywords provided to the web-crawler of client system 602 to retrieve suspect website data 622. For example, the plurality of keywords provided to the web-crawler of client system 602 may include words, terms, and/or phrases that are frequently associated with counterfeit, illegal, or otherwise illicit products, such as "deal," "cheap," "rare," certain brand names, etc. The at least one keyword 624 may include a one or more of those provided keywords that was found on the suspect website.

Suspect website data 622 also include website content 626, product details 628, and merchant details 630. Website content 626 may include text- and/or image-based content retrieved from the suspect website and may be analyzed (e.g., by IWI computing device 112) to determine whether the suspect website should be further investigated, as described herein. Website content 626 may or may not include one or more of keywords 624, product details 628, and merchant details 630. Product details 628 include, for example, price, description, one or more images, specifications, and/or other details associated with one or more product(s) offered for sale on the suspect website. Merchant details 630 may include a merchant name, merchant identifier, merchant location, and/or other details associated with the merchant associated with the suspect website and/or the product(s) offered for sale thereon.

IWI computing device 112 maintains a suspect website log 620, for example, on an internal or external memory device in communication therewith (e.g., database 120, shown in FIG. 2). Suspect website log 620 is populated with entries including suspect website data 622 received from client system 602 and includes at least website content 626 associated with one or more suspect website(s). Suspect website data 622 may be sorted, indexed, and/or otherwise organized according to any data elements included in suspect website data 622. For example, IWI computing device 112 may index suspect website data 622 in suspect website log 620 according to website content 626 (e.g., according to website, for example, URL), merchant details 630 (e.g., according to merchant), product details 628 (e.g., according to product type, price, etc.), keywords 624, and/or any other data element (e.g., time and/or date received from client system 602 in signal 621). IWI computing device 112 may update suspect website log 620 with received suspect website data 622.

IWI computing device 112 also includes a rules module 640. In the example embodiment, rules module 640 includes a plurality of identification parameters or rules 642. IWI computing device further includes an identification module 650 configured to retrieve one or more identification rules 642 from rules module 620 to process and/or analyze received transaction data 610 against suspect website data 622 to identify one or more suspect websites as illicit. Identification rules 642 include rules or parameters to facilitate identification of suspect website data 622 in received transaction data 610. Put another way, identification module 650 uses identification rules 642 to identify at which suspect websites any illicit transactions are taking place by comparing suspect website data 622 and transaction data 610. Identification rules 642 may include, for example, a match of two or more fields between transaction data 610 and suspect website data 622 (e.g., website content 626, product details 628, and/or merchant details 630), a match of a country code (e.g., merchant location 616) with a high-risk country code (e.g., China or India), and/or a mismatch between one or more elements of transaction data 610 and suspect website data 622 (e.g., the transaction is processed by one or more parties not identified in website content 626 or merchant details 630).

Merchant identifiers 614 and/or product identifiers 618 in received transaction data 610 may not adhere to standards or naming conventions. For example, acquirers 26 may set their schema for these fields, such that these received data points may not match or correlate directly to suspect website data 622 during the identification process. Accordingly, in some cases, IWI computing device 112 may process received transaction data 610 (and/or suspect website data 622) to account for any misspellings, aliases, abbreviations, acronyms, and/or other such differences in merchant identifiers 614 and/or product identifiers 618. IWI computing device 112 may access database 120 to retrieve information associated with merchant identifiers 614 and/or product identifiers 618, wherein database 120 is configured to store collected, built, standardized, and aggregated merchant and/or product information (e.g., identifiers, locations, etc.). Such collection, standardization, and aggregation is performed by various parties associated with interchange network 28, including, in some embodiments, IWI computing device 112. In some embodiments, IWI computing device 112, in addition to or instead of accessing database 120 to retrieve such information, may implement its own set of rules, algorithms, and processes to standardize merchant and/or product identifiers 614, 618. For example, IWI computing device 112 may be configured to process received product identifiers 618 formatted as SKUs to parse particular items details therefrom.

In some embodiments, identification rules 642 may additionally or alternatively include "expected prices" for commonly counterfeit items and threshold(s) of deviation therefrom. For example, if a commonly counterfeit product costs $5,000 from a legitimate manufacturer, a particular identification rule 642 may include a deviation threshold of $1,000 from the legitimate cost (allowing for, for example, sales prices), such that any transaction data 610 identifying a purchase of that product at a transaction amount 612 of less than $4,000, the suspect website is identified as an illicit website for further investigation.

In other words, IWI computing device 112 uses identification module 650 to identify one or more suspect website and/or merchants or acquirers associated therewith as illicit, based on received transaction data 610. Transaction data 610 serves as a verification or identification tool in that an active or completed transaction on a suspect website verifies that illicit activity may be occurring thereon, whereas suspect websites without any active or completed transactions associated therewith may present less potential harm to consumers. In some embodiments, IWI computing device 112 stores a table or log (not shown) identifying each merchant associated with an acquirer, such that, upon identification of an illicit merchant, the associated acquirer may be identified. It should be understood that although suspect websites, merchants, and/or acquirers may be identified as "illicit" for further investigation, such investigation may result in a finding that the website, merchant, and/or acquirer is not illicit. Accordingly, identification as "illicit" is merely an internal identification that prompts such investigation and is not taken as evidence or fact that the website, merchant, and/or acquirer is, in fact, partaking in or associated with illicit activities.

IWI computing device 112 is configured to generate an identification report 652 based on the output from identification module 650. Identification report 652 may include one or more identified illicit websites, merchants, and/or acquirers. IWI computing device 112 may generate identification report 652 at regular intervals (e.g., every day, every week, every month, etc.) and/or may generated identification report 652 upon each individual occurrence of an identified illicit website, merchant, and/or acquirer. Additionally or alternatively, IWI computing device 112 may generate a separate identification report 652 for each identified illicit website, merchant, and/or acquirer and/or for each "category" of illicit parties (e.g., a merchant report 652, an acquirer report 652, and a website report 652).

IWI computing device 112 is configured to transmit an identification signal 654 to one or more parties. Identification signal 654 includes identification report 652. In some embodiments, IWI computing device 112 transmits identification signal 654 to one or more client systems 602. Client systems 602 may be associated with a law enforcement agency and/or another investigatory party. In such embodiments, identification signal 654 may be configured to automatically prompt or cause initiation of an investigation into any identified party in identification report 652. For example, identification signal 654 may be configured to activate client system 602 to initiate an investigation into an identified illicit party. IWI computing device 112 may additionally or alternatively transmit identification signal 654 to an identified illicit merchant 24 and/or an identified illicit acquirer 26. Identification signal 654 may include a warning signal 655 including a cease and desist or other warning message to the identified illicit merchant 24 and/or identified illicit acquirer 26 to stop any suspected illicit activities. In the example embodiment, IWI computing device 112 is configured to transmit any of the above-described message directly to the associated party, for example, using network 115 (shown in FIG. 2).

Figure 7:
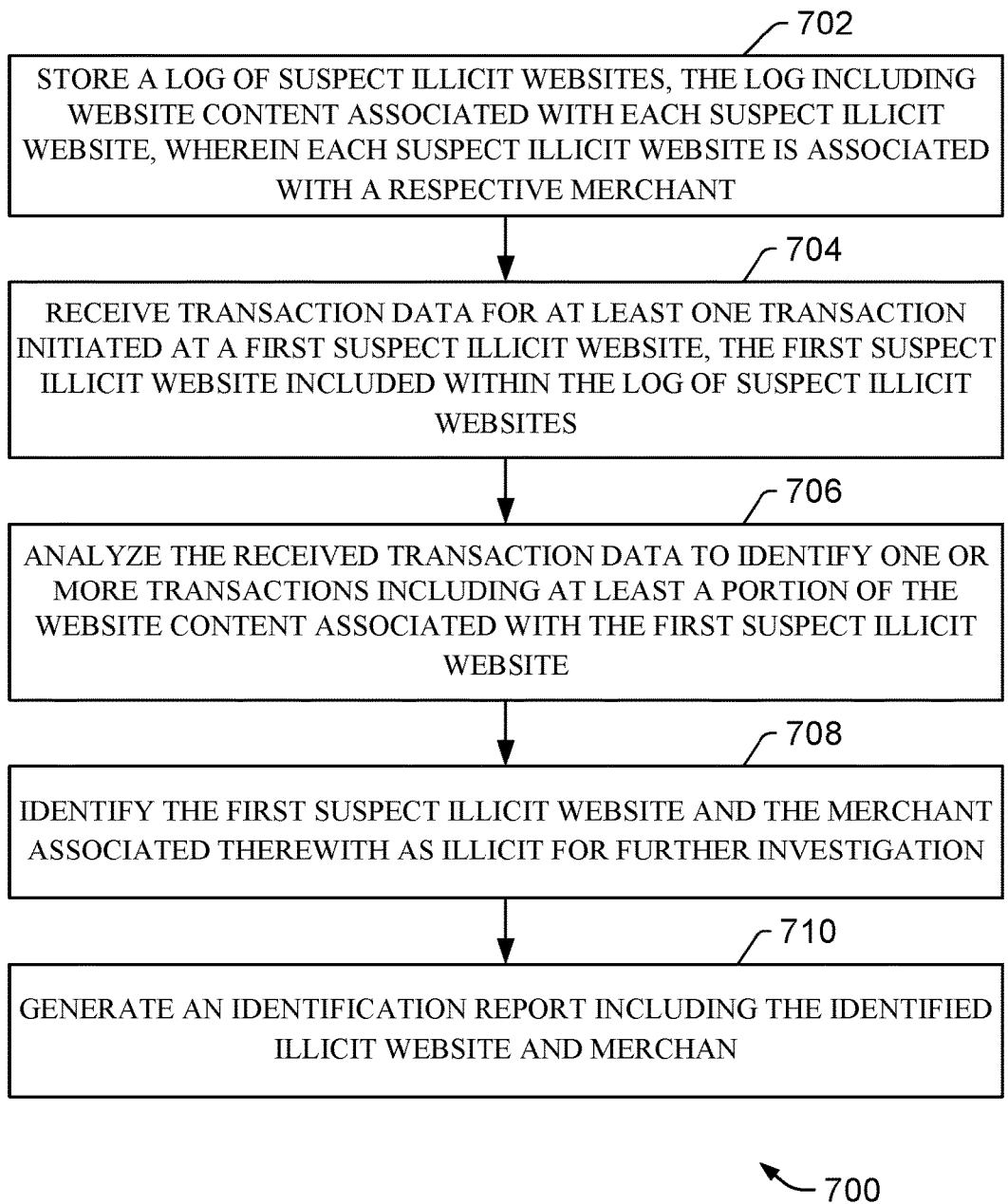

FIG. 7 is a flowchart of a method 700 for identifying illicit websites and merchants associated therewith using the illicit activity monitoring (IAM) system 100 (shown in FIG. 2). Method 700 may be implemented by illicit website identifying (IWI) computing device 112 (shown in FIGS. 2, 3, and 6). Method 700 includes storing 702 a log of suspect illicit websites (e.g., suspect website log 620, shown in FIG. 6). The log may be stored at a memory (e.g., database 120, shown in FIG. 2). In addition, the log includes website content associated with each suspect illicit website, and each suspect illicit website is associated with a respective merchant. Method 700 further includes receiving 704 transaction data (e.g., transaction data 610, shown in FIG. 6) for at least one transaction initiated at a first suspect illicit website, the first suspect illicit website included within the log of suspect illicit websites.

Method 700 further includes analyzing 706 the received transaction data to identify one or more transactions including at least a portion of the website content (e.g., website content 626, shown in FIG. 6) associated with the first suspect illicit website. Method 700 also includes identifying 708 the first suspect illicit website and the merchant associated therewith as illicit for further investigation and generating 710 an identification report including the identified illicit website and merchant.

Figure 8:
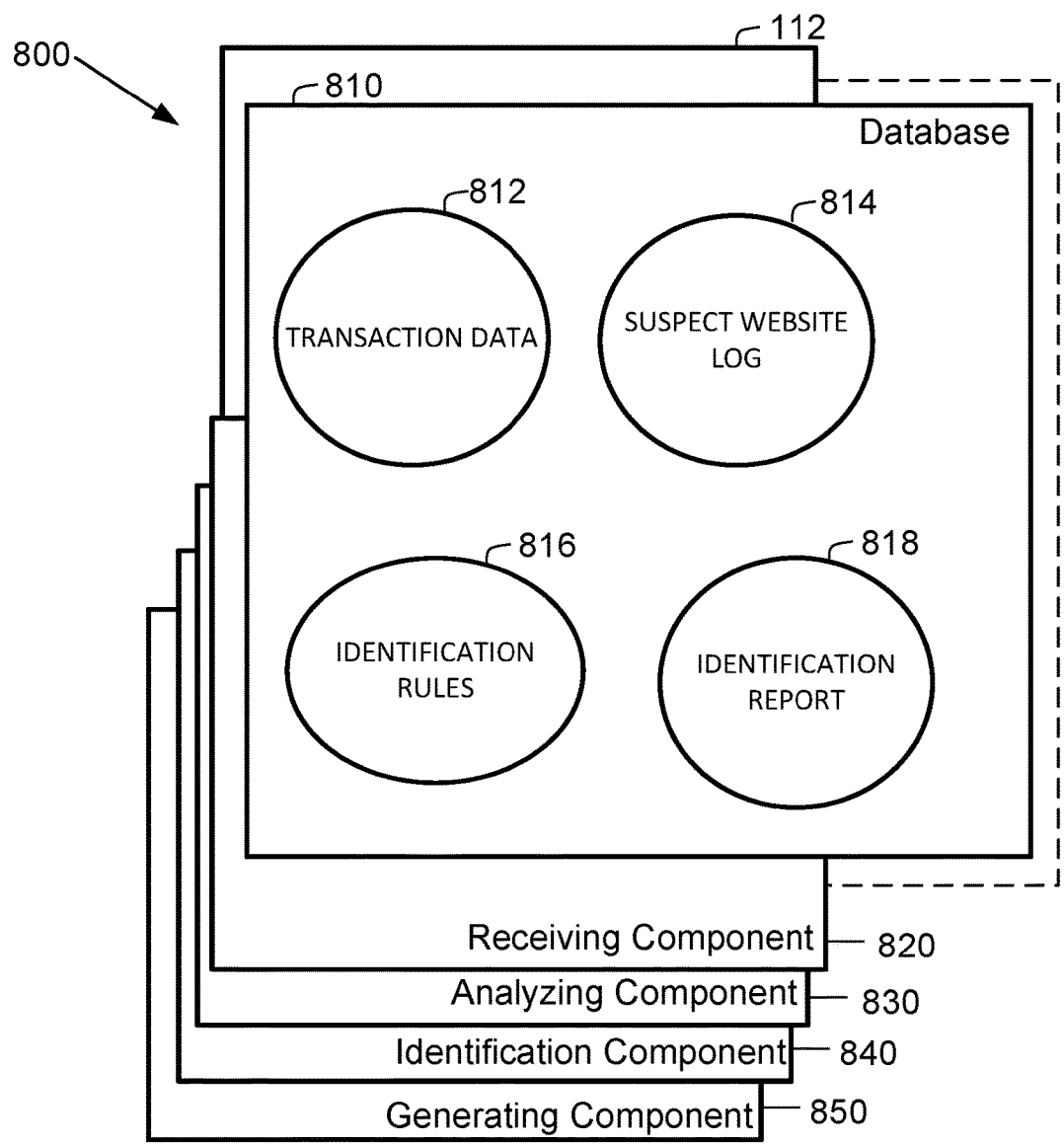

FIG. 8 is a diagram of components of illicit website identifying (IWI) computing device 112 that may be used in the illicit activity monitoring (IAM) system 100 shown in FIG. 1. A database 810 may be coupled with several separate components within IWI computing device 112, which perform specific tasks. In this embodiment, database 810 includes transaction data 812, which may be received from, for example, a payment processor in communication with IWI computing device 112. Database 810 further includes a suspect website log 814, which includes website content and other data associated with a plurality of suspect illicit websites, including merchants associated therewith. Database 810 also includes identification rules 816 for identifying illicit merchants, websites, and/or acquirers, and at least one identification report 818 including the identified illicit parties.

In the example embodiment, IWI computing device 112 includes a receiving component 820, configured to receive transaction data 812 for at least one transaction initiated at a first suspect illicit website, the first suspect illicit website included within the log of suspect illicit websites 814. IWI computing device 112 also includes an analyzing component 830, configured to analyze the received transaction data 812 to identify one or more transactions including at least a portion of the website content associated with the first suspect illicit website. IWI computing device further includes an identification component 840 configured to identify the first suspect illicit website and the merchant associated therewith as illicit for further investigation. In some embodiments, analyzing component 830 and/or identification component 840 may retrieve and/or use one or more identification rules 816 in the analysis and/or identification performed thereby. Although analyzing component 830 and identification component 840 are described as separate components performing separate functions, in some embodiments, analyzing component 830 and identification component 840 may be a single component and/or may perform similar functions.

IWI computing device 112 further includes a generating component 850, which is configured to generate an identification report 818 including the identified illicit website and merchant. IWI computing device 112 may include additional components that are not shown in FIG. 8, including, for example, a transmitting component configured to transmit an identification signal including generated identification report 818.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An illicit activity monitoring (IAM) computer system for identifying illicit websites and merchants, the IAM computer system comprising:
   a payment processing network server configured to process payment card transactions over a payment processing network using a set of proprietary communication standards for the exchange of financial transaction data and the settlement of funds between financial institutions that are members of the payment processing network, wherein said payment processing network server is configured to:
      store a plurality of merchant codes, each merchant code associated with a corresponding one of a plurality of merchants registered to submit transactions to the payment processing network via one of the member financial institutions;
      receive a plurality of authorization request messages, each authorization request message including payment transaction data for a payment transaction, the payment transaction data including one of the merchant codes; and
      store the payment transaction data in a transaction history database; and
   an illicit website identifying (IWI) computing device, the IWI computing device including a processor in communication with a memory, said processor programmed to:
      provide keywords associated with an illicit product to a web-crawler;
      receive suspect website data from the web-crawler;
      store, at the memory, a log of suspect illicit websites identified from the suspect website data, the log including respective website content associated with each suspect illicit website, wherein each suspect illicit website is associated with a respective merchant;
      store, at the memory, one or more rules for confirming the suspect illicit websites as illicit based on the payment transaction data, the one or more rules including at least one of a match of a merchant country code in the payment transaction data with a high-risk country code and a threshold deviation of a payment amount in the payment transaction data from an expected price;
      match at least one payment transaction from the transaction history database to a first suspect illicit website of the log of suspect illicit websites by identifying at least a portion of the website content associated with the first suspect illicit website in at least one data field of the at least one payment transaction;
      confirm, by applying the one or more rules to the matched at least one payment transaction, the first suspect illicit website as illicit;
      identify the merchant associated with the matched at least one payment transaction by matching the merchant code in the matched at least one payment transaction against the plurality of merchant codes stored by the payment processing network; and
      generate an identification report including the identified illicit website and the identified merchant.

2. The IAM computer system of claim 1, wherein website content includes at least one of merchant details, a product price, and additional product details.

3. The IAM computer system of claim 1, wherein said processor is further programmed to transmit an identification signal to an investigating party, the identification signal including the generated identification report.

4. The IAM computer system of claim 1, wherein said processor is further programmed to transmit a warning signal to the merchant associated with the identified illicit website, the warning signal including a warning to cease and desist any illicit activities.

5. The IAM computer system of claim 1, wherein said processor is further programmed to transmit a warning signal to an acquirer associated with the merchant, the warning signal including a warning to cease and desist any illicit activities.

6. The IAM computer system of claim 1, wherein said processor is further programmed to implement one or more identification rules for performing said identification of the first suspect illicit website, and wherein the one or more identification rules include a match of two or more fields between the payment transaction data and the website content of the first suspect illicit website.

7. A computer-implemented method for identifying illicit websites and merchants using an illicit activity monitoring (IAM) computer system including a payment processing network server and an illicit website identifying (IWI) computing device including a processor in communication with a memory, said method comprising:

storing, at the payment processing network server, a plurality of merchant codes, wherein the payment processing network server is configured to process payment card transactions over a payment processing network using a set of proprietary communication standards for the exchange of financial transaction data and the settlement of funds between financial institutions that are members of the payment processing network and wherein each merchant code associated with a corresponding one of a plurality of merchants registered to submit transactions to the payment processing network via one of the member financial institutions;

receiving, at the payment processing network server, a plurality of authorization request messages including payment transaction data for a payment transaction, the payment transaction data including one of the merchant codes;

storing, by the payment processing network server, the payment transaction data in a transaction history database;

providing, by the IWI computing device, keywords associated with an illicit product to a web-crawler;

receiving, by the IWI computing device, suspect website data from the web-crawler;

storing, at the memory by the IWI computing device, a log of suspect illicit websites identified from the suspect website data, the log including respective website content associated with each suspect illicit website, wherein each suspect illicit website is associated with a respective merchant;

storing, at the memory by the IWI computing device, one or more rules for confirming the suspect illicit websites as illicit based on the payment transaction data, the one or more rules including at least one of a match of a merchant country code in the payment transaction data with a high-risk country code and a threshold deviation of a payment amount in the payment transaction data from an expected price;

matching, by the IWI computing device, at least one payment transaction from the transaction history database to a first suspect illicit website of the log of suspect illicit websites by identifying at least a portion of the website content associated with the first suspect illicit website in at least one data field of the least one payment transaction;

confirming, by the IWI computing device applying the one or more rules to the matched at least one payment transaction, the first suspect illicit website as illicit;

identifying, by the IWI computing device, the merchant associated with the matched at least one payment transaction by matching the merchant code in the matched at least one payment transaction against the plurality of merchant codes stored by the payment processing network; and generating, by the IWI computing device, an identification report including the identified illicit website and the identified merchant.

8. The computer-implemented method of claim 7, further comprising storing by the IWI computing device, website content associated with each suspect illicit website, wherein website content includes at least one of merchant details, a product price, and additional product details.

9. The computer-implemented method of claim 7, further comprising transmitting, by the IWI computing device, an identification signal to an investigating party, the identification signal including the generated identification report.

10. The computer-implemented method of claim 7, further comprising transmitting, by the IWI computing device, a warning signal to the merchant associated with the identified illicit website, the warning signal including a warning to cease and desist any illicit activities.

11. The computer-implemented method of claim 7, further comprising transmitting, by the IWI computing device, a warning signal to an acquirer associated with the merchant, the warning signal including a warning to cease and desist any illicit activities.

12. The computer-implemented method of claim 7, wherein identifying the first suspect illicit website and the merchant associated therewith as illicit for further investigation comprises implementing, by the IWI computing device, one or more identification rules, wherein the one or more identification rules include
a match of two or more fields between the payment transaction data and the website content of the first suspect illicit website.

13. At least one non-transitory computer-readable storage media having (i) a first set of computer-executable instructions embodied thereon for execution by a payment processing network server configured to process payment card transactions over a payment processing network using a set of proprietary communication standards for the exchange of financial transaction data and the settlement of funds between financial institutions that are members of the payment processing network, and (ii) a second set of computer-executable instructions embodied thereon for execution by an illicit website identifying (IWI) computing device, the IWI computing device including at least one processor in communication with a memory, wherein the first set of computer-executable instructions cause the payment processing network server to:

store a plurality of merchant codes, each merchant code associated with a corresponding one of a plurality of merchants registered to submit transactions to the payment processing network via one of the member financial institutions;

receive a plurality of authorization request messages, each authorization request message including payment transaction data for a payment transaction, the payment transaction data including one of the merchant codes;

store the payment transaction data in a transaction history database;

and wherein the second set of computer-executable instructions, when executed by the IWI computing device, cause the IWI computing device to:

provide keywords associated with an illicit product to a web-crawler;

receive suspect website data from the web-crawler;

store, at the memory, a log of suspect illicit websites identified from the suspect website data, the log including respective website content associated with each suspect illicit website, wherein each suspect illicit website is associated with a respective merchant;

store, at the memory, one or more rules for confirming the suspect illicit websites as illicit based on the payment transaction data, the one or more rules including at least one of a match of a merchant country code in the payment transaction data with a high-risk country code and a threshold deviation of a payment amount in the payment transaction data from an expected price;

match at least one payment transaction from the transaction history database to a first suspect illicit website of the log of suspect illicit websites by identifying at least a portion of the website content associated with the first suspect illicit website in at least one data field of the at least one payment transaction;

confirm, by applying the one or more rules to the matched at least one payment transaction, the first suspect illicit website as illicit;

identify the merchant associated with the matched at least one payment transaction by matching the merchant code in the matched at least one payment transaction against the plurality of merchant codes stored by the payment processing network; and generate an identification report including the identified illicit website and the identified merchant.

14. The computer-readable storage media of claim 13, wherein website content includes at least one of merchant details, a product price, and additional product details.

15. The computer-readable storage media of claim 13, wherein the second set of computer-executable instructions, when executed by the IWI computing device, further cause the IWI computing device to transmit an identification signal to an investigating party, the identification signal including the generated identification report.

16. The computer-readable storage media of claim 13, wherein the second set of computer-executable instructions, when executed by the IWI computing device, further cause the IWI computing device to transmit a warning signal to at least one of the merchant associated with the identified illicit website and an acquirer associated with the merchant, the warning signal including a warning to cease and desist any illicit activities.

17. The computer-readable storage media of claim 13, wherein the second set of computer-executable instructions, when executed by the IWI computing device, further cause the IWI computing device to implement one or more identification rules to identify the first suspect illicit website as illicit, and wherein the one or more identification rules include:

a match of two or more fields between the payment transaction data and the website content of the first suspect illicit website.

* * * * *